US012726081B2

(12) United States Patent
Dienbauer et al.

(10) Patent No.: US 12,726,081 B2
(45) Date of Patent: Sep. 1, 2026

(54) METHOD FOR THE DEMAND-RESPONSIVE OPERATION OF AN ELECTRIC TRACTION DRIVE FOR A MOTOR VEHICLE

(71) Applicant: MAGNA Powertrain GmbH & Co KG, Lannach (AT)

(72) Inventors: Michael Dienbauer, Graz (AT); Gerald Lechner, Graz (AT)

(73) Assignee: MAGNA Powertrain GmbH & Co KG, Lannach (AT)

( * ) Notice: Subject to any disclaimer, the term of this patent is extended or adjusted under 35 U.S.C. 154(b) by 164 days.

(21) Appl. No.: 18/916,296

(22) Filed: Oct. 15, 2024

(65) Prior Publication Data

US 2025/0125686 A1 Apr. 17, 2025

(30) Foreign Application Priority Data

Oct. 17, 2023 (DE) ........................ 102023210158.0

(51) Int. Cl.
*H02K 9/19* (2006.01)

(52) U.S. Cl.
CPC .................................... *H02K 9/19* (2013.01)

(58) Field of Classification Search
CPC .... B60K 1/00; B60K 11/02; B60K 2001/006; H02K 9/19
See application file for complete search history.

(56) References Cited

U.S. PATENT DOCUMENTS 10,286,780 B2 * 5/2019 Quehenberger ....... B60K 17/35
2019/0376496 A1 * 12/2019 Nassif .................... F04B 23/04
2020/0362926 A1 * 11/2020 Germer ............... B60K 17/344

FOREIGN PATENT DOCUMENTS

WO 2023006218 A1 2/2023

OTHER PUBLICATIONS

German Search Report for DE102023210158.0 dated Sep. 10, 2024.

* cited by examiner

*Primary Examiner* — Naishadh N Desai
(74) *Attorney, Agent, or Firm* — Dickinson Wright PLLC

(57) ABSTRACT

A method for the demand-responsive operation of an electric traction drive. The electric traction drive comprises a hydraulic assembly having an electric motor-driven pump unit which is actuatable in first and second directions of rotation such that a plurality of pump operating modes can be set. The motor-driven pump unit is connected via a heat-exchanger to at least two fluid outlets for partial volume flows, each of which is connected to at least one subcomponent of the electric traction drive. At least one fluid outlet is additionally opened by means of a hydraulically switchable valve, where a switchover in the direction of rotation of the motor-driven pump unit is executed. The motor-driven pump unit is activated based on measured, calculated and/or saved status data for the electric traction drive, and the direction of rotation. The pump operating mode and pump speed are regulated based on a vehicle operating mode detected.

13 Claims, 9 Drawing Sheets

| Übergang zwischen den Fahrzeugbetriebsmodi 1000, 2000, 3000 | Bedingungen |
|---|---|
| **Basis Modus 1000 → Performance Modus 2000** | $T_{Rotor,max} - T_{Rotor,aktuell} > \Delta T_{Rotor,Performance}$<br>$T_{Stator,max} - T_{Stator,aktuell} > \Delta T_{Stator,Performance}$<br>$T_{Ölsumpf} < T_{Ölsumpf,Performance}$<br>$QF_{Kühlwasser} > QF_{Performance,min}$ |
| **Basis Modus 1000 → Efficiency Modus 3000** | $T_{Rotor,max} - T_{Rotor,aktuell} > \Delta T_{Rotor,Efficiency}$<br>$T_{Stator,max} - T_{Stator,aktuell} > \Delta T_{Stator,Efficiency}$<br>$T_{Ölsumpf} < T_{Ölsumpf,Efficiency}$<br>$QF_{Kühlwasser} > QF_{Efficiency,min}$ |
| **Efficiency Modus 3000 → Performance Modus 2000** | $T_{Rotor,max} - T_{Rotor,aktuell} > \Delta T_{Rotor,Performance}$<br>$T_{Stator,max} - T_{Stator,aktuell} > \Delta T_{Stator,Performance}$<br>$T_{Ölsumpf} < T_{Ölsumpf,Performance}$<br>$QF_{Kühlwasser} > QF_{Performance,min}$ |
| **Efficiency Modus 3000 → Basis Modus 1000** | $T_{Rotor,max} - T_{Rotor,aktuell} > \Delta T_{Rotor,Base}$<br>$T_{Stator,max} - T_{Stator,aktuell} > \Delta T_{Stator,Base}$<br>$T_{Ölsumpf} < T_{Ölsumpf,Base}$<br>$QF_{Kühlwasser} > QF_{Base,min}$ |
| **Performance Modus 2000 → Efficiency Modus 3000** | $T_{Rotor,max} - T_{Rotor,aktuell} > \Delta T_{Rotor,Efficiency}$<br>$T_{Stator,max} - T_{Stator,aktuell} > \Delta T_{Stator,Efficiency}$<br>$T_{Ölsumpf} < T_{Ölsumpf,Efficiency}$<br>$QF_{Kühlwasser} > QF_{Efficiency,min}$ |
| **Performance Modus 2000 → Basis Modus 1000** | $T_{Rotor,max} - T_{Rotor,aktuell} > \Delta T_{Rotor,Base}$<br>$T_{Stator,max} - T_{Stator,aktuell} > \Delta T_{Stator,Base}$<br>$T_{Ölsumpf} < T_{Ölsumpf,Base}$<br>$QF_{Kühlwasser} > QF_{Base,min}$ |

Fig. 9

METHOD FOR THE DEMAND-RESPONSIVE OPERATION OF AN ELECTRIC TRACTION DRIVE FOR A MOTOR VEHICLE

CROSS-REFERENCE TO RELATED APPLICATIONS

The invention is based on DE102023210158.0, filed on Oct. 17, 2023 at the German Patent Office, which is hereby incorporated by reference.

FIELD

The present invention relates to a method for the demand-responsive operation of an electric traction drive, wherein the electric traction drive comprises an electrically controllable motor-driven pump unit and a hydraulic assembly.

BACKGROUND

Conventional combustion engine-driven vehicles now stand in opposition to electric and partially electric vehicle drive systems. In the absence of the combustion engine as a reliable heat source for interior air-conditioning, and for the heating and cooling requirements of the novel drive components of electric and partially electric drive systems, heating, cooling and lubrication systems are also undergoing fundamental change. The focus of the development of such systems, in consideration of all safety-related marginal conditions, is an efficient and demand-responsive employment of available energy, and thus the optimum operation of electrically powered vehicles, with respect to range.

SUMMARY

One object of the invention is the presentation of an improved method for the demand-responsive operation of an electric traction drive.

This requirement can be fulfilled by the subject matter of the present invention, according to independent patent Claim 1. Advantageous embodiments of the present invention are described in the dependent claims.

The method according to the invention is employed for the demand-responsive operation of an electric traction drive.

According to the invention, the electric traction drive comprises a hydraulic assembly having an electric motor-driven pump unit, wherein the motor-driven pump unit is actuatable in two directions of rotation, namely, in a first direction of rotation, and in a second direction of rotation which is in opposition to the first direction of rotation, such that a plurality of pump operating modes can be set.

Moreover, according to the invention, the motor-driven pump unit is connected via a heat-exchanger to at least two fluid outlets for partial volume flows, each of which is connected, for the purposes of cooling and/or heat-up and/or lubrication to at least one subcomponent of the electric traction drive, wherein at least one fluid outlet is additionally opened or closed by means of at least one hydraulically switchable valve, where a switchover in the direction of rotation of the motor-driven pump unit is executed.

According to the invention, the motor-driven pump unit is activated on the basis of measured, calculated and/or saved status data for the electric traction drive, and the direction of rotation, and thus the pump operating mode and pump speed, are regulated on the basis of a vehicle operating mode detected.

The vehicle operating mode is preferably selected by a vehicle driver, by a superordinate driving mode controller and/or on the basis of route data.

In addition to a passive pump operating mode, namely, a pump shutdown mode, in which the motor-driven pump unit is not in service, the setting of at least three active pump operating modes is preferably possible, namely, a first pump operating mode, in which operation of the electric motor of the motor-driven pump unit is executed with speed control in the first direction of rotation of the electric motor, a second pump operating mode, in which operation of the electric motor of the motor-driven pump unit is executed with speed control in the second direction of rotation, and/or a third pump operating mode, in which a reverse operation of the electric motor of the motor-driven pump unit is executed with speed control in the first direction of rotation and the second direction of rotation.

The motor-driven pump unit is preferably regulated on the basis of measured, calculated and/or saved data for the temperature of subcomponents of the electric traction drive for the individual vehicle operating modes, in a given pump operating mode.

In the event of an approach to, and/or an overshoot and/or undershoot of a limiting value which is defined for the respective subcomponents of the electric traction drive, a cooling and/or heating demand is preferably determined for each of the subcomponents of the electric traction drive, and an overall cooling and/or heating demand is calculated wherein, on the basis of the overall cooling and/or heating demand, the direction of rotation, and thus the pump operating mode are regulated, together with the pump speed.

Moreover, during the active cooling and/or heat-up and/or lubrication of the electric traction drive, an actual total volume flow of fluid in the hydraulic assembly is preferably determined, which is compared with a specified target total volume flow wherein, in the event of a deviation of the actual total volume flow from the target total volume flow for a specified time period, a control setting is executed for the alternating operation of the motor-driven pump unit in the first direction of rotation at the maximum pump speed, and in the second direction of rotation at the maximum pump speed, for as many times as necessary until the actual total volume flow no longer deviates from the target total volume flow.

BRIEF DESCRIPTION OF THE DRAWINGS

The invention is described below by way of example with reference to the drawings.

FIG. 9 shows a table of conditions governing transitions between vehicle operating modes.

DETAILED DESCRIPTION

Figure 1:
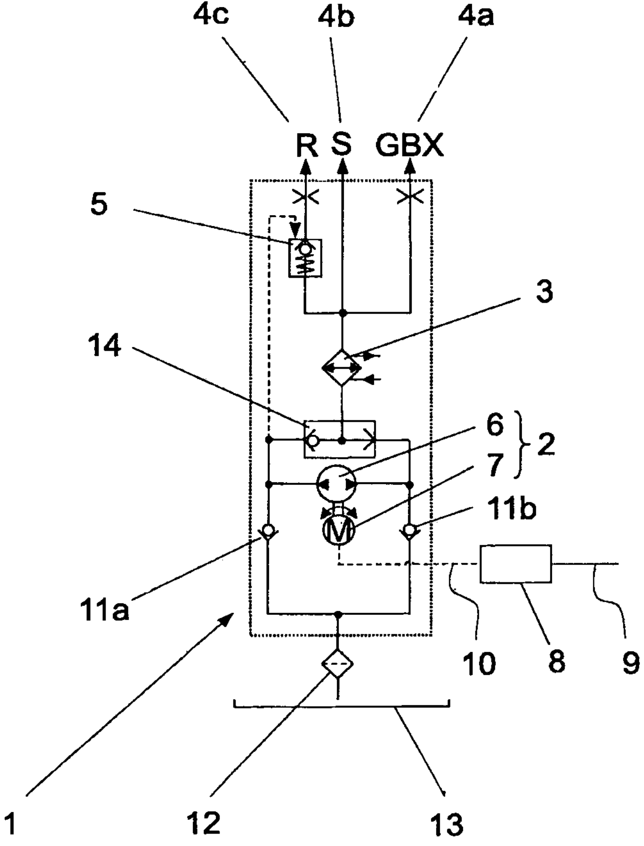
FIG. 1 shows a hydraulic assembly of an electric traction drive.

FIG. 1 shows an exemplary representation of a simplified circuit diagram of a hydraulic assembly 1 of an electric traction drive, in which the method 100 according to the invention is applied. However, the application of the method 100 according to the invention is not limited to the specific variant of embodiment represented—the variant of embodiment represented is employed solely as a basis for the description of the method 100 according to the invention.

The electric traction drive, in addition to a traction machine in the form of an electric machine and a gearbox GBX, comprises a hydraulic assembly 1 having an electric motor-driven pump unit 2.

The electric machine can be operated in a motor mode and a generator mode and comprises a stationary stator S and a rotatable rotor RS.

The electric motor-driven pump unit 2 comprises a fluid pump 6 and an electric motor 7, wherein the fluid pump 6 is driveable by means of the electric motor 7 in two directions of rotation, namely, in a first direction of rotation A, and in a second direction of rotation B, which is in opposition to the first direction of rotation A.

Actuation of the electric motor 7 of the motor-driven pump unit 2 is executed by means of an electric control unit 8, which is connected to a data interface 9. The control unit 8 is connected to the electric motor 7 via a control line 10.

On the intake side and pressure side, the fluid pump 6 is connected to a fluid sump 13, in the present exemplary embodiment to an oil sump, via a first check valve 11*a* and a second check valve 11*b*, and via a filter element 12. Depending upon the direction of rotation A, B of the fluid pump 6 of the motor-driven pump unit 2, one of the two check valves 11*a*, 11*b* is in an open position, and the other of the two check valves 11*a*, 11*b*, in each case, is in a closed position.

In particular, by means of the method 100 for operating the electric traction drive, in addition to lubrication, functions for cooling, heating, and for the pre- and post-conditioning of the electric traction drive can be executed, together with the switchover of these functions in the interests of optimum energy distribution within the system. To this end, the electric traction drive is subdivided into subcomponents, wherein each subcomponent can dictate a requirement for cooling or heating. The electric machine, more specifically the stator S and the rotor R thereof, the gearbox GBX, the fluid sump 13, the heat-exchanger 3 and the hydraulic assembly 1, in the present exemplary embodiment, respectively represent an exemplary subcomponent of the electric traction drive.

The motor-driven pump unit 2 of the hydraulic assembly 1 is connected via a shuttle valve 14, and via a heat-exchanger 3 which is arranged upstream of the shuttle valve 14, to three fluid outlets 4*a*, 4*b*, 4*c* for partial volume flows—a first fluid outlet 4*a* is fluidically connected to the gearbox GBX of the electric traction drive, a second fluid outlet 4*b* is fluidically connected to the stator S of the electric machine of the traction drive, and a third fluid outlet 4*c* is fluidically connected to the rotor R of the electric machine of the electric traction drive.

The third fluid outlet 4*c* can be opened and closed by means of a hydraulically switchable valve 5.

Figure 2:
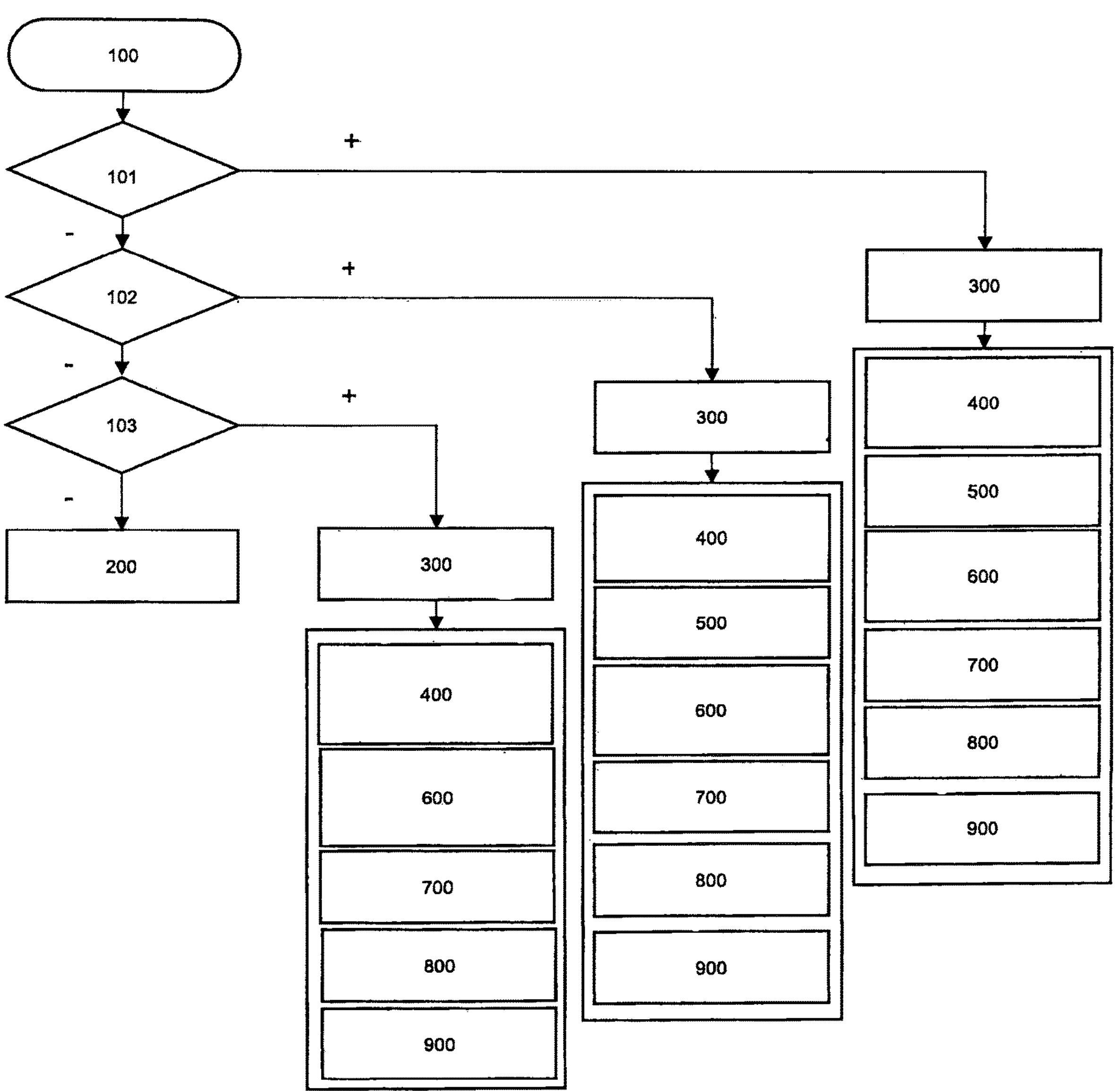
FIG. 2 shows a schematic sequence of a method for operating an electric traction drive.

FIG. 2 shows a schematic representation of the sequence of the method 100 for the demand-responsive operation of the electric traction drive.

The method 100 for the demand-responsive operation of an electric traction drive provides for various pump operating modes, which are dependent upon a vehicle operating mode 1000, 2000, 3000, 4000 which is selected by the driver of a vehicle, or upon an automated selection which is executed in accordance with a superordinate operating strategy, for example on the basis of a selected route, a system status, a prediction derived from a current operating state, etc.

In the present non-limiting exemplary embodiment, the vehicle driver and/or a superordinate control unit is permitted to choose between the four vehicle operating modes 1000, 2000, 3000, 4000:

Basic Mode 1000

This mode is employed as a standard driving mode, in which all requirements for specified marginal conditions are fulfilled. In this case, a weighted and realistic driving cycle is employed as a basis for evaluation, which is sourced from the "WLTC" standard (class C of the "WLTP": "worldwide harmonized light-duty vehicles test procedure"), wherein all requirements are also fulfilled in the "WLTC". Compliance with performance limits is maintained for specified durations, and temperatures remain within specified ranges, or below specified limiting values.

"Performance" Mode 2000

In partially or exclusively oil-cooled electric traction machines, the cooling oil demand of the rotor and stator varies-according to the respective working point-particularly in response to copper, iron and magnetic losses occurring in the electric machine. In the interests of maximum thermal availability, i.e. the most prolonged and greatest power availability of the electric machine, the mass flow of oil, with respect to magnitude and distribution between the rotor and stator, is set in a demand-responsive and predictive manner. By focusing on the thermal state, it is intended that all the components of the electric traction drive should be maintained below their critical temperatures for as long as possible, thereby maximizing thermal availability. In this mode, an improvement of energy efficiency fulfils only a subordinate role.

"Efficiency" Mode 3000

In this mode, energy consumption of the electric traction drive in arbitrary driving cycles is minimized, or the efficiency of the electric traction drive is maximized. This is achieved by the consideration of the traction drive from an overall energy perspective. In addition to components of the electric machine of the electric traction drive, the reduction gearbox and the lubricant cooling oil are maintained between specific temperature limits, in order to operate the traction drive at its optimum thermal working point. Consideration is given, inter alia, to hydraulic drag losses and the electric drive power of the electric motor-driven pump unit. By the demand responsive distribution of quantities of heat generated, temperatures of different regions or subcomponents can be raised and lowered in a targeted manner, in the interests of setting the most energy-efficient working point, from an overall system perspective.

"Conditioning" Mode 4000

A distinction is drawn between pre- and post-conditioning of the electric traction drive. The "Conditioning" mode is activated upon the stoppage of the vehicle. Before and after the operation of the electric traction drive, it may be necessary for the system to be conditioned, in order to permit the efficient operation of the system thereafter, or to protect the system against damage. At low temperatures, before start-up, it is logical for the system to be pre-heated to a certain degree, in order to reduce losses. After operation, active cooling may be necessary if, for example, the system has been brought to a standstill (immobilized or parked) from high-capacity operation, e.g. at maximum speed, within a short space of time.

In the case of pre-conditioning—primarily in case of a cold start—subcomponents of the electric traction drive, such as the gearbox GBX and the electric machine, are thermally regulated to an optimally efficient working temperature prior to any actual travel.

Post-conditioning is primarily employed after travel with a high power demand, in order to reduce the resulting high temperatures of subcomponents of the electric traction drive to customary working temperatures.

The motor-driven pump unit 2 is activated on the basis of measured, calculated and/or saved status data for the electric traction drive and, on the basis of a vehicle operating mode 1000, 2000, 3000, 4000 thus detected, the direction of rotation, and thus the pump operating mode are regulated, together with a pump speed.

The setting of pump operating modes is achieved by the switchover of the direction of rotation A, B of the motor-driven pump unit 2. A switchover of the direction of rotation alters the fluid distribution on the rotor R and the stator S of the electric machine of the electric traction drive, wherein a constantly smaller volume flow is directed via the gearbox GBX in all cases. Moreover, in addition to the two directions of rotation A, B having constant percentage distributions, an intermittent reverse operation is also represented in which, as a temporal average, throughflows between the limits of the two directions of rotation A, B can be reproduced.

Thus, in summary, three pump operating modes can be set:

- a first pump operating mode, in which operation of the electric motor of the motor-driven pump unit 2 is executed with speed control in the first direction of rotation A of the electric motor;
- a second pump operating mode, in which operation of the electric motor of the motor-driven pump unit 2 is executed with speed control in the second direction of rotation B, and/or
- a third pump operating mode, in which a reverse operation of the electric motor of the motor-driven pump unit 2 is executed with speed control in the first direction of rotation A and in the second direction of rotation B.

In a first step 100, the method comprises a plurality of query blocks 101, 102, 103. In query block 101, a query is executed as to whether an active cooling of the electric traction drive, or of at least one of the subcomponents thereof, is required. In query block 102, a query is executed as to whether an active heating of the electric traction drive, or of at least one of the subcomponents thereof, is required. In query block 103, a query is executed as to whether any conditioning of the electric traction drive, or of at least one of the subcomponents thereof, is required. If the response to all these query blocks 101, 102, 103 is "no", it is not necessary for the electric motor-driven pump unit 2 to be brought into service—and the latter thus assumes a passive pump shutdown mode (block 200). If a response to one of the query blocks is "yes", the electric motor-driven pump unit 2 is regulated or set to an active pump operating mode (block 300) (FIG. 2).

Thereafter, for the optimum functional operation of the electric traction drive, subject to a respective response of "yes" to query blocks 101, 102, 103, a plurality of stipulated function blocks 400, 500, 600, 700, 800, 900 are executed wherein, in the case of the two query blocks 101 and 102 for cooling and/or heating, the same function blocks are executed in the same sequence, namely (FIG. 2):

- an "Operating mode setting and parameter loading" function block 400
- an "Influencing factor determination" function block 500
- a "Scaling and pump speed calculation" function block 600
- a "Diagnostic" function block 700
- a "Release of jammed fluid pump" function block 800, and
- a "Further application-specific function blocks" function block 900.

In the case of query block 103 for conditioning, the following function blocks are executed in sequence (FIG. 2):

- the "Operating mode setting and parameter loading" function block 400
- the "Scaling and pump speed calculation" function block 600
- the "Diagnostic" function block 700
- the "Release of jammed fluid pump" function block 800, and
- the "Further application-specific function blocks" function block 900.

In FIG. 3 to FIG. 7 respectively, the individual function blocks 400, 500, 600, 700, 800, 900 are represented in detail.

Figure 3:
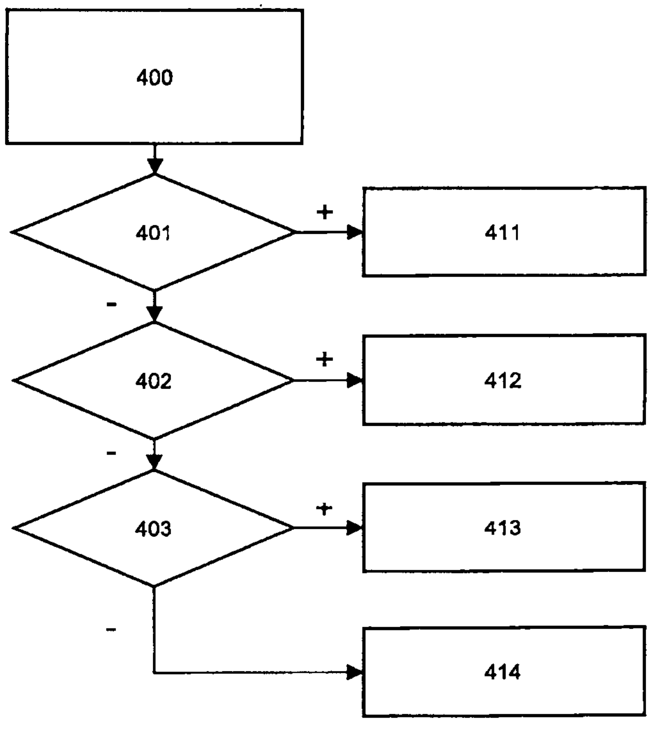
FIG. 3 shows a detailed flow diagram for a first block from FIG. 2.

FIG. 3 shows the "Operating mode setting and parameter loading" function block 400 in detail. In this function block 400, three query blocks 401, 402, 403 are executed in sequence. In query block 401, a query is executed as to whether the "Performance" mode 2000 is permissible and active. In query block 402, a query is executed as to whether the "Efficiency" mode 3000 is permissible and active. In query block 403, a query is executed as to whether the "Conditioning" mode 4000 is permissible and active. If the response to each of these query blocks is "no", the "Parameter loading for Basic mode" function block 414 is executed. If the response to query block 401 is "yes", the "Parameter loading for Performance mode" function block 411 is executed. If the response to query block 402 is "yes", the "Parameter loading for Efficiency mode" function block 412 is executed. If the response to query block 403 is "yes", the "Parameter loading for Conditioning mode" function block 413 is executed.

The method 100 for operating the electric traction drive employs "influencing factors". Each subcomponent can notify a fluid throughflow demand for cooling and/or heating and/or conditioning and/or lubrication. The sum of all these demands defines the overall demand for the electric traction drive. In addition to quantity, by means of selected subcomponents, the direction of rotation A, B of the fluid pump 6 can also be defined. In the event that neither of the two directions of rotation A, B is appropriate, the hydraulic assembly also provides an option for intermittent reverse operation, i.e. the third pump operating mode. In this mode, as a temporal average, a throughflow is generated in both directions which lies between the throughflows in the two directions of rotation A, B.

These two variables—speed and direction of rotation—are scaled with reference to the hydraulic assembly 1, and a corresponding speed of the fluid pump 6 is generated as an output. Moreover, this speed can also be further restricted by various influencing variables.

The method 100 is structured in a fully parameterizable manner, such that it can be simply scaled and applied to different electric traction drives. Individual subfunctions can be deactivated, and all target values and performance characteristics can be freely parameterized.

Selection of the vehicle operating mode 1000, 2000, 3000, 4000 is executed by the vehicle driver and/or by means of an automated selection undertaken by a control unit. The selected vehicle operating mode 1000, 2000, 3000, 4000 generates an optimum setting of target values and parameters (performance characteristics and look-up tables). For any potential transition phase required between the vehicle operating modes 1000, 2000, 3000, 4000, an interpolation of values is executed.

If a changeover between two vehicle operating modes 1000, 2000, 3000, 4000 is requested, a check is executed as to whether such a change is currently permissible and possible. Particularly in the event of a changeover to the "Performance" mode 2000, compliance with temperature levels and cooling capacity is necessary on the grounds that an increased power loss, and thus a higher thermal load, must be anticipated for this vehicle operating mode.

If a direct changeover to the desired vehicle operating mode 1000, 2000, 3000, 4000 is not possible, it is endeavored to transpose the system to a corresponding state—depending upon the system, this may take up to several minutes. To this end, optionally, feedback can be delivered to the vehicle driver as to when the "new" operating mode will be fully available.

Selectable vehicle operating modes 1000, 2000, 3000, 4000 dictate a thermal target state, in order to achieve the respective target of the vehicle operating mode 1000, 2000, 3000, 4000.

Figure 4:
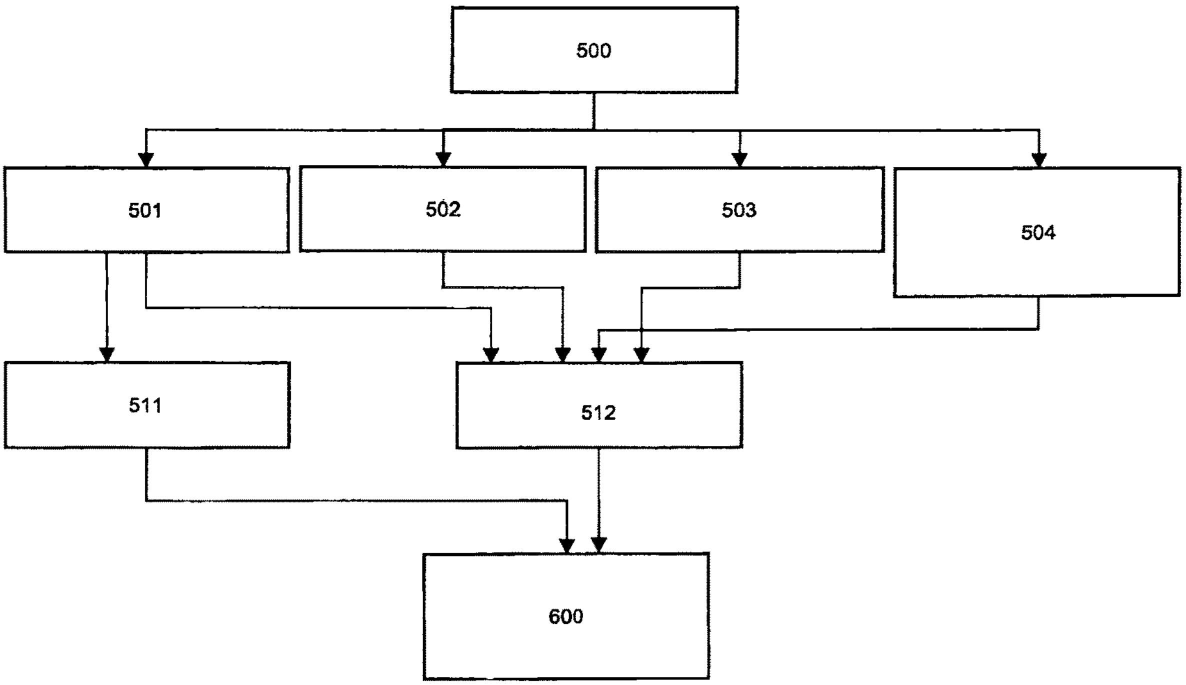
FIG. 4 shows a detailed flow diagram for a second block from FIG. 2.

FIG. 4 shows the "Influencing factor determination" function block in detail. In this function block 500, four function blocks 501, 502, 503, 504 are executed in parallel with one another. In function block 501, determination of the cooling and/or heating demand of the rotor R of the electric machine of the electric traction drive is executed. In function block 502, determination of the cooling and/or heating demand of the stator S of the electric machine of the electric traction drive is executed. In function block 503, determination of the cooling and/or heating demand of the fluid sump 13 of the hydraulic assembly 1 of the electric traction drive is executed. In function block 504, determination of cooling demand by reference to the load point and temperature gradients is executed. From cooling and/or heating demands thus determined, an "Overall influencing factor calculation" function block 512 is generated. From the determination of cooling and/or heating demand in function block 501, a function block 512 is further derived for the definition of the direction of rotation A, B of the fluid pump 6 of the motor-driven pump unit 2 of the hydraulic assembly 1.

Figure 5:
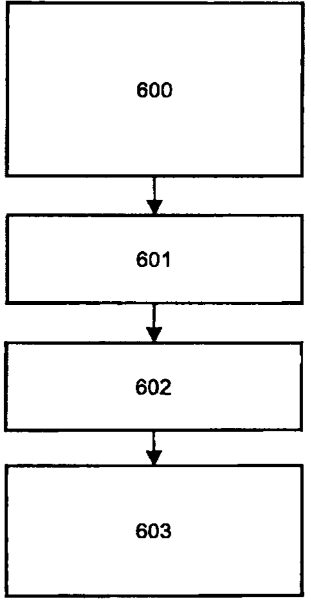
FIG. 5 shows a detailed flow diagram for a third block from FIG. 2.

FIG. 5 shows the "Scaling and pump speed calculation" function block 600 in detail. In this function block 600, a sequence of three function blocks 601, 602, 603 is executed. In function block 601, calculation of the pump speed of the fluid pump 6 is executed. In function block 602, a suppression of rapid pump speed variations is executed, for example in order to improve NVH performance and minimize the energy consumption of the fluid pump 6. In function block 603, a limitation of the pump speed is executed, according to the current vehicle operating state 1000, 2000, 3000, 4000.

Figure 6:
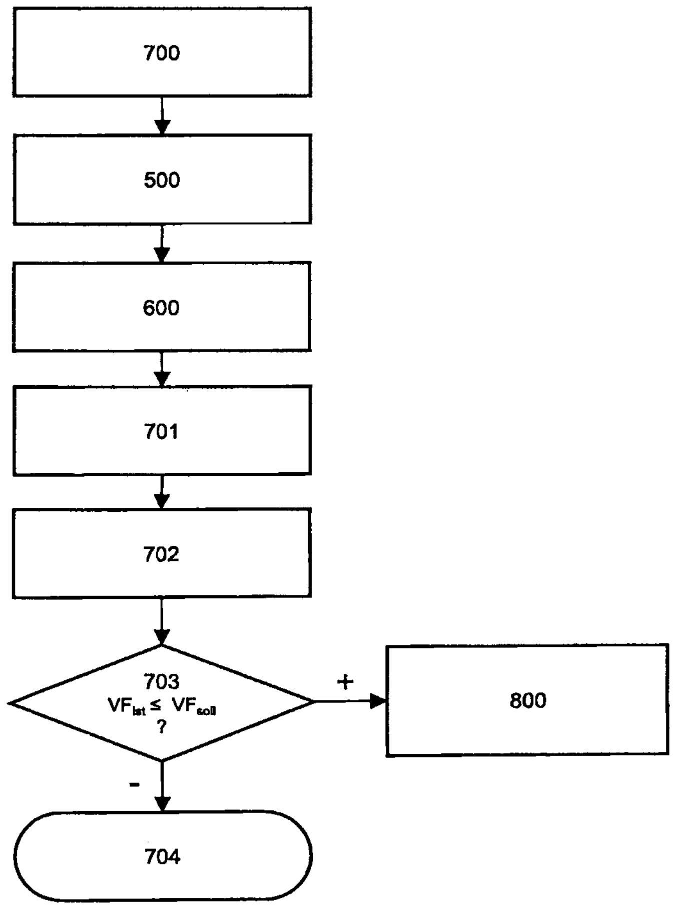
FIG. 6 shows a detailed flow diagram for a fourth block from FIG. 2.

FIG. 6 shows the "Diagnostic" function block 700 in detail. In this function block 700, four function blocks 500, 600, 701, 702 are executed in sequence. The first two function blocks 500 and 600 have already been described with reference to FIG. 4 and FIG. 5. In function block 701, determination of a current fluid circulation rate is executed. In function block 702, a plausibility check of the target pump speed and throughflow is executed, followed by query block 703, as to whether "VF actual≤VF target". If the response to query block 703 is "no", the outcome is "Diagnosis in order" 704. If the response of this query block is "yes", the "Release of jammed fluid pump" function block 800 is executed in accordance with FIG. 7.

Figure 7:
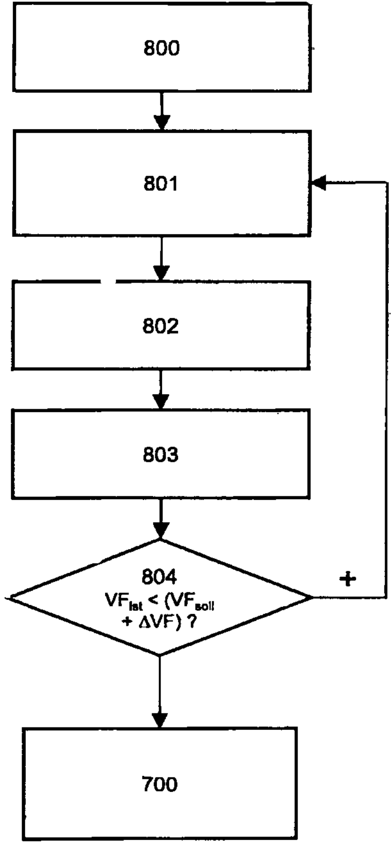
FIG. 7 shows a detailed flow diagram for a fifth block from FIG. 2.

FIG. 7 shows the "Release of jammed fluid pump" function block 800 in detail. In this function block 800, four function blocks 801, 802, 803, 700 are executed in sequence. In function block 801, an alternating operation of the fluid pump 6 in the first direction of rotation A and in the second direction of rotation B is executed at maximum speed for a specified duration. This function block 801 can be repeated up to three times. In function block 802, operation of the fluid pump is executed with a specified test speed and test direction of rotation A, B. In function block 803, a plausibility check is executed, followed by query block 804, as to whether "VFactual≤(VFtarget+ΔVF)". If the response of this query block 804 is "no", function block 700 is executed, as described above with reference to FIG. 6. If the response of this query block is "yes", function block 801 is restarted, followed by function blocks 802, 803 and query block 804, for checking as to whether "VFactual≤(VFtarget+ΔVF)", until such time as the response of query block 804 is "no".

Figure 8:
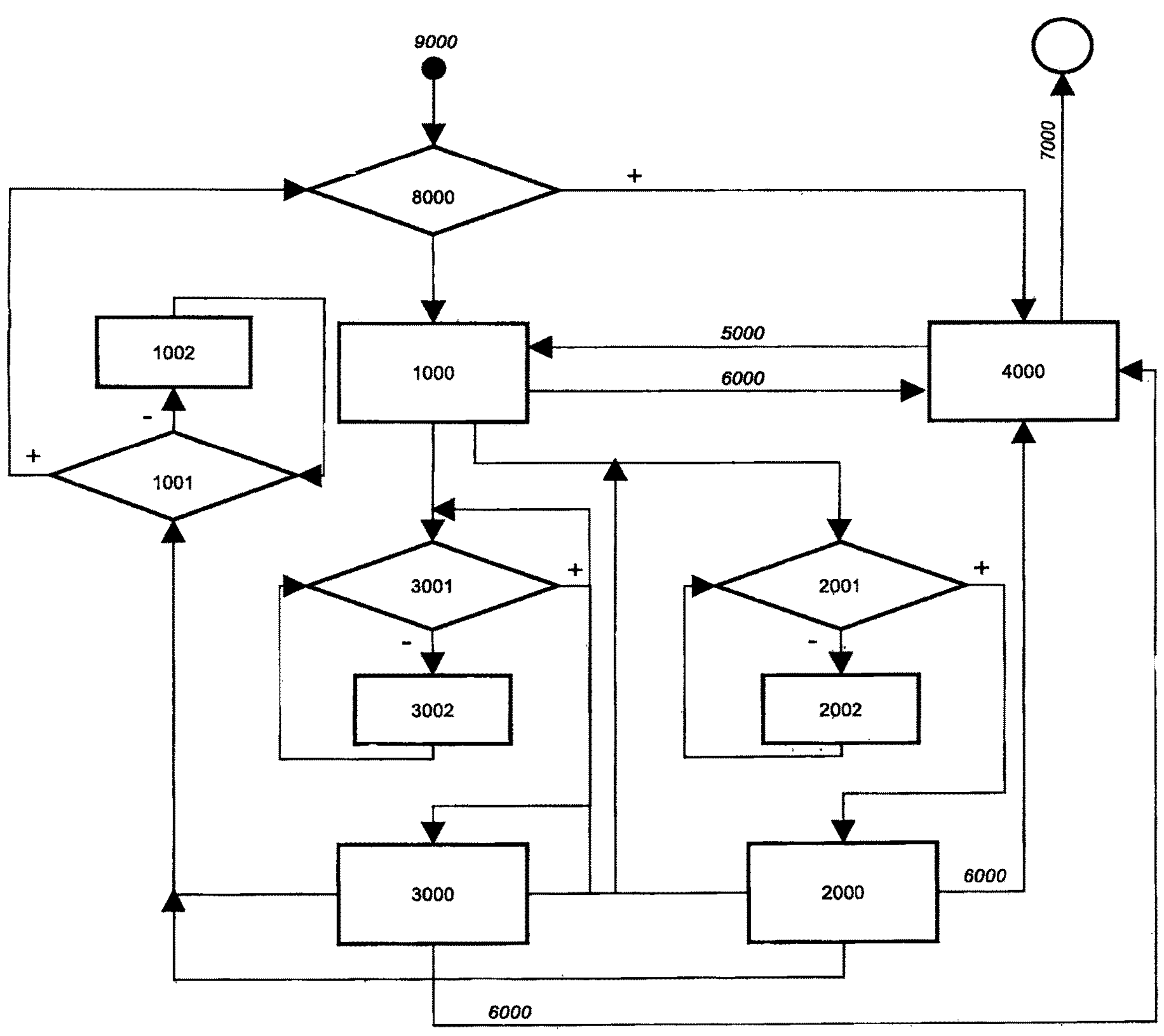
FIG. 8 shows a schematic sequence for the switchover between vehicle operating modes.

The flow diagram in FIG. 8 shows a schematic representation of the changeover between the various vehicle operating modes 1000, 2000, 3000, 4000, together with the start 9000 and interruption 7000 of the method 100 for operating the electric traction drive. Although it is not necessary for all the exemplary vehicle operating modes 1000, 2000, 3000, 4000 to be employed, it is also possible for additional vehicle operating modes to be included. Moreover, a transition between the individual vehicle operating modes 1000, 2000, 3000, 4000 can also be blocked, if this transition is not permissible.

If the method 100 is started, a query is generated as to whether conditioning is to be executed (query block 8000). A start 9000 of the method 100 does not equate to a vehicle start-up 5000. If the electric traction drive is to be conditioned, a transition to "Conditioning" mode 4000 is executed or, if not, to the Basic mode 1000. According to the definition and layout employed, the initial mode can also differ.

If "Conditioning" mode 4000 is executed, upon a vehicle start-up 5000, an automatic transition proceeds from the "Conditioning" mode to the Basic mode 1000, or to the initial mode defined.

A transition between the individual vehicle operating modes 1000, 2000, 3000, 4000 is invariably executed according to the same structure, wherein the status of the electric traction drive is checked, and it is thus established whether this status is permissible for the "new" vehicle operating mode 1000, 2000, 3000, 4000 (query blocks 1001, 2001, 3001). If all conditions are fulfilled, the transition to the new vehicle operating mode 1000, 2000, 3000, 4000 is executed (function blocks 1002, 2002, 3002). If not all conditions are fulfilled, it is endeavored to transpose the electric traction drive to an appropriate state. If this is not possible, for example upon the expiry of a specified time, the current vehicle operating mode setting remains in force. Requisite conditions (but not by way of limitation) are the rotor R (magnet) temperature, the stator S temperature, the fluid sump 13 temperature, the fluid temperature and fluid throughflow. In the event of a vehicle stoppage (parking of the vehicle) 6000, the switchover to "Conditioning" mode 4000 is executed. Interruption 7000 of the method 100 is only executed once the electric traction drive has achieved a (thermally) secure state.

FIG. 9 shows a table, in which different exemplary transitions between the Basic mode 1000, "Performance" mode 2000 and "Efficiency" mode 3000 vehicle operating modes are plotted in the left-hand column, and conditions to be fulfilled for these transitions are plotted in the right-hand column.

Depending upon the desired vehicle operating mode 1000, 2000, 3000, 4000, specific parameters for the values represented in the table according to FIG. 9 must not be overshot or undershot. For example, the current rotor temperature TRotor, current and the current stator temperature TStator, current for the "Performance" mode 2000 must be sufficiently low, and sufficient cooling capacity, delivered by coolant fluid, must be available. In "Efficiency" mode 3000, higher temperatures may be permissible on the grounds that, at lower power, lower losses are generated, and demands made on the coolant fluid side are reduced as a result. Consequently, upon the transition to the Basic mode 1000 or the "Performance" mode, the temperature levels of the rotor R and stator S must firstly be reduced.

It should be observed that exact limiting values and conditions are highly dependent upon the electric traction drive to which the method 100 is applied. Moreover, a superordinate vehicle operating strategy is a critical factor for parameterization.

In current electric traction drives, with effect from a specified temperature, a reduction of the available drive torque is initiated, in the interests of the thermal protection of the electric traction drive and its subcomponents. As a result, a proportion of potential power remains unused ("torque derating").

By the employment of the hydraulic assembly 1, fluid volume flows can be set in a flexible manner, such that "torque derating" is delayed, as a result of which, even at high temperatures, a greater torque is available for a certain time. In practice, torque is only reduced at higher temperatures, as the fluid volume flow is not only directly dependent upon the electric machine of the electric traction drive, but can also be set with reference to other variables, for example temperatures and gradients, fluid throughflow and temperature, speed of the electric machine, torque, etc.

LIST OF REFERENCE SIGNS

1 Hydraulic assembly
2 Motor-driven pump unit
3 Heat-exchanger
**4*a*** First fluid outlet
**4*b*** Second fluid outlet
**4*c*** Third fluid outlet
5 Hydraulically switchable valve
6 Fluid pump
7 Electric motor
8 Control unit
9 Data interface
10 Control line
**11*a*** First check valve
**11*b*** Second check valve
12 Filter element
13 Fluid sump
14 Shuttle valve
100 Method for operating an electric traction drive
101, 102, 103,
401, 402, 403,
703, 804, 1001,
2001, 3001, 8000 Query block
200, 300, 400,
411, 412, 413,
414, 500, 501,
502, 503, 504,
511, 512, 600,
601, 602, 603,
700, 701, 702,
704, 800, 801,
802, 803, 900,
1002, 2002, 3002 Function block
1000 Basic mode
2000 "Performance" mode
3000 "Efficiency" mode
4000 "Conditioning" mode
5000 Vehicle start-up
6000 Vehicle stoppage (parking of vehicles)
7000 Interruption of method
9000 Start of method
R Rotor
S Stator
GBX Gearbox
T Temperature
$T_{Stator,\ current}$ Current stator temperature
$T_{Rotor,\ current}$ Current rotor temperature
$T_{Stator,\ max}$ Maximum stator temperature
$T_{Rotor,\ max}$ Maximum rotor temperature
$\Delta T_{Stator,\ XXX}$ Limiting value for stator temperature differential in XXX mode (XXX=Basic, Performance, Efficiency)
$\Delta T_{Rotor,\ XXX}$ Limiting value for rotor temperature differential in XXX mode (XXX=Basic, Performance, Efficiency)
$T_{Oil\ sump}$ Oil sump temperature
$T_{Oil\ sump,\ XXX}$ Limiting value for oil sump temperature in XXX mode (XXX=Basic, Performance, Efficiency)
QF Heat flow
$QF_{Cooling\ water}$ Cooling water heat flow
$QF_{XXX,\ min}$ Heat flow limiting value in XXX mode (XXX=Basic, Performance, Efficiency)
VF Volume flow
VFactual Actual volume flow
VFtarget Target volume flow
ΔVF Differential between actual volume flow and target volume flow
+ "yes"
− "no"

The invention claimed is:

1. A method for the demand-responsive operation of an electric traction drive, wherein the electric traction drive comprises a hydraulic assembly having an electric motor-driven pump unit, wherein the motor-driven pump unit is actuatable in two directions of rotation, namely, in a first direction of rotation and in a second direction of rotation, which is in opposition to the first direction of rotation, such that a plurality of pump operating modes can be set, and wherein the motor-driven pump unit is connected via a heat-exchanger to at least two fluid outlets for partial volume flows, each of which is connected, for the purposes of cooling and/or heat-up and/or lubrication, to at least one subcomponent of the electric traction drive, wherein at least one fluid outlet is additionally opened by means of at least one hydraulically switchable valve, where a switchover in the direction of rotation of the motor-driven pump unit is executed, wherein the motor-driven pump unit is activated on the basis of measured, calculated and/or saved status data for the electric traction drive, and the direction of rotation, and thus the pump operating mode and pump speed, are regulated on the basis of a vehicle operating mode detected.

2. The method as claimed in claim 1, wherein the vehicle operating mode is selected by a vehicle driver or by means of an automated selection which is undertaken by a control unit.

3. The method as claimed in claim 1, wherein, in addition to a passive pump operating mode, namely, a pump shutdown mode, in which the motor-driven pump unit is not in service, the setting of at least three active pump operating modes is possible, namely, a first pump operating mode, in which operation of the electric motor of the motor-driven pump unit is executed with speed control in the first direction of rotation of the electric motor, a second pump operating mode, in which operation of the electric motor of the motor-driven pump unit is executed with speed control in the second direction of rotation, and/or a third pump operating mode, in which a reverse operation of the electric motor of the motor-driven pump unit is executed with speed control in the first direction of rotation and the second direction of rotation.

4. The method as claimed in claim 1, wherein the motor-drive pump unit is regulated on the basis of measured, calculated and/or saved data for the temperature of subcomponents of the electric traction drive for the individual vehicle operating modes, in a given pump operating mode.

5. The method as claimed in claim 4, wherein, in the event of an approach to, and/or an overshoot and/or undershoot of at least one limiting value which is defined for the respective subcomponents of the electric traction drive, a cooling and/or heating demand is determined for each of the subcomponents, and an overall cooling and/or heating demand is calculated wherein, on the basis of the overall cooling and/or heating demand, the direction of rotation and thus the pump operating mode are regulated, together with the pump speed.

6. The method as claimed in one of claim 1, wherein, during the active cooling and/or heat-up and/or lubrication of the electric traction drive, an actual total volume flow of fluid in the hydraulic assembly is determined, which is compared with a specified target total volume flow wherein, in the event of a deviation of the actual total volume flow from the target total volume flow for a specified time period, a control setting is executed for the alternating operation of the motor-driven pump unit in the first direction of rotation at the maximum pump speed, and in the second direction of rotation at the maximum pump speed, for as many times as necessary until the actual total volume flow no longer deviates from the target total volume flow.

7. The method as claimed in claim 2, wherein, in addition to a passive pump operating mode, namely, a pump shutdown mode, in which the motor-driven pump unit is not in service, the setting of at least three active pump operating modes is possible, namely, a first pump operating mode, in which operation of the electric motor of the motor-driven pump unit is executed with speed control in the first direction of rotation of the electric motor, a second pump operating mode, in which operation of the electric motor of the motor-driven pump unit is executed with speed control in the second direction of rotation, and/or a third pump operating mode, in which a reverse operation of the electric motor of the motor-driven pump unit is executed with speed control in the first direction of rotation and the second direction of rotation.

8. The method as claimed in claim 2, wherein the motor-drive pump unit is regulated on the basis of measured, calculated and/or saved data for the temperature of subcomponents of the electric traction drive for the individual vehicle operating modes, in a given pump operating mode.

9. The method as claimed in claim 3, wherein the motor-drive pump unit is regulated on the basis of measured, calculated and/or saved data for the temperature of subcomponents of the electric traction drive for the individual vehicle operating modes, in a given pump operating mode.

10. The method as claimed in one of claim 2, wherein, during the active cooling and/or heat-up and/or lubrication of the electric traction drive, an actual total volume flow of fluid in the hydraulic assembly is determined, which is compared with a specified target total volume flow wherein, in the event of a deviation of the actual total volume flow from the target total volume flow for a specified time period, a control setting is executed for the alternating operation of the motor-driven pump unit in the first direction of rotation at the maximum pump speed, and in the second direction of rotation at the maximum pump speed, for as many times as necessary until the actual total volume flow no longer deviates from the target total volume flow.

11. The method as claimed in one of claim 3, wherein, during the active cooling and/or heat-up and/or lubrication of the electric traction drive, an actual total volume flow of fluid in the hydraulic assembly is determined, which is compared with a specified target total volume flow wherein, in the event of a deviation of the actual total volume flow from the target total volume flow for a specified time period, a control setting is executed for the alternating operation of the motor-driven pump unit in the first direction of rotation at the maximum pump speed, and in the second direction of rotation at the maximum pump speed, for as many times as necessary until the actual total volume flow no longer deviates from the target total volume flow.

12. The method as claimed in one of claim 4, wherein, during the active cooling and/or heat-up and/or lubrication of the electric traction drive, an actual total volume flow of fluid in the hydraulic assembly is determined, which is compared with a specified target total volume flow wherein, in the event of a deviation of the actual total volume flow from the target total volume flow for a specified time period, a control setting is executed for the alternating operation of the motor-driven pump unit in the first direction of rotation at the maximum pump speed, and in the second direction of rotation at the maximum pump speed, for as many times as necessary until the actual total volume flow no longer deviates from the target total volume flow.

13. The method as claimed in one of claim 5, wherein, during the active cooling and/or heat-up and/or lubrication of the electric traction drive, an actual total volume flow of fluid in the hydraulic assembly is determined, which is compared with a specified target total volume flow wherein, in the event of a deviation of the actual total volume flow from the target total volume flow for a specified time period, a control setting is executed for the alternating operation of the motor-driven pump unit in the first direction of rotation at the maximum pump speed, and in the second direction of rotation at the maximum pump speed, for as many times as necessary until the actual total volume flow no longer deviates from the target total volume flow.

* * * * *